(12) United States Patent
Wiesbeck et al.

(10) Patent No.: US 10,933,860 B2
(45) Date of Patent: Mar. 2, 2021

(54) METHOD AND DEVICE FOR OPERATING A HYBRID VEHICLE COMPRISING AN ELECTRIC ENERGY STORE, AN ELECTRIC MOTOR AND AN INTERNAL COMBUSTION ENGINE

(71) Applicant: Bayerische Motoren Werke Aktiengesellschaft, Munich (DE)

(72) Inventors: Ferdinand Wiesbeck, Munich (DE); Arthur Huelsmann, Munich (DE); Eric Berger, Freising (DE); Johann Engl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 174 days.

(21) Appl. No.: 16/170,889

(22) Filed: Oct. 25, 2018

(65) Prior Publication Data

US 2019/0061736 A1 Feb. 28, 2019

Related U.S. Application Data

(63) Continuation of application No. PCT/EP2017/058934, filed on Apr. 13, 2017.

(30) Foreign Application Priority Data

Apr. 26, 2016 (DE) ...................... 10 2016 207 039.8

(51) Int. Cl.
*B60W 20/17* (2016.01)
*B60W 10/06* (2006.01)
(Continued)

(52) U.S. Cl.
CPC ............... *B60W 20/17* (2016.01); *B60K 6/20* (2013.01); *B60W 10/06* (2013.01); *B60W 10/08* (2013.01);
(Continued)

(58) Field of Classification Search
CPC ......... B60K 6/20; B60W 10/06; B60W 10/08; B60W 10/26; B60W 20/00; B60W 20/13;
(Continued)

(56) References Cited

U.S. PATENT DOCUMENTS

| 6,783,195 | B1 | 8/2004 | Grabsch |
| 7,292,932 | B1 | 11/2007 | Ledger et al. |

(Continued)

FOREIGN PATENT DOCUMENTS

| AT | 508 606 A2 | 2/2011 |
| CN | 104097631 A | 10/2014 |

(Continued)

OTHER PUBLICATIONS

International Search Report (PCT/ISA/210) issued in PCT Application No. PCT/EP2017/058934 dated Jul. 18, 2017 with English translation (six (6) pages).

(Continued)

*Primary Examiner* — Tyler J Lee
(74) *Attorney, Agent, or Firm* — Crowell & Moring LLP

(57) ABSTRACT

A method and a device operate a hybrid vehicle having an electric energy store, an electric propulsion system and an internal combustion engine. A special operating strategy that can be initiated for the internal combustion engine allows the state of charge of the energy store to be increased when predefined acoustic conditions are met. The special operating strategy has a performance-enhancing effect by raising the load point until acoustic limits are reached which are ascertained in real time, can be predefined in a variable manner and are defined in accordance with ascertained potentials for masking specific acoustic events. The disclosed method and device for carrying out the method raise the acoustic limits for controlling the load point of the internal combustion engine at least to the level that is (Continued)

currently admissible as a result of at least one acoustically relevant event being masked, possible acoustically relevant events being defined by vehicle-internal sources of influence, the characteristic spectra of which are known from empirical assessments and the occurrence of which is controlled by vehicle-internal systems.

10 Claims, 6 Drawing Sheets

(51) Int. Cl.
*B60W 10/26* (2006.01)
*B60W 10/08* (2006.01)
*B60W 20/00* (2016.01)
*B60W 20/13* (2016.01)
*B60K 6/20* (2007.10)
*G10K 11/175* (2006.01)

(52) U.S. Cl.
CPC ............ *B60W 10/26* (2013.01); *B60W 20/00* (2013.01); *B60W 20/13* (2016.01); *G10K 11/175* (2013.01); *B60W 2530/00* (2013.01); *B60W 2710/0666* (2013.01); *B60Y 2200/92* (2013.01); *B60Y 2300/91* (2013.01); *Y02T 10/62* (2013.01)

(58) Field of Classification Search
CPC ............ B60W 20/17; B60W 2530/00; B60W 2710/0666; B60Y 2200/92; B60Y 2300/91; G10K 11/175; Y02T 10/6286
See application file for complete search history.

(56) References Cited

U.S. PATENT DOCUMENTS

| | | | | |
|---|---|---|---|---|
| 8,108,132 B2* | 1/2012 | Reinke | ................... | F02D 17/04 |
| | | | | 123/198 F |
| 8,209,103 B2* | 6/2012 | Oyama | .................. | B60K 6/445 |
| | | | | 701/101 |
| 8,712,652 B2* | 4/2014 | Harada | .................. | B60K 6/445 |
| | | | | 701/54 |
| 9,227,621 B2* | 1/2016 | Martin | ..................... | B60K 6/46 |
| 10,654,468 B2* | 5/2020 | Huelsmann | ........... | B60W 10/06 |
| 2009/0248204 A1 | 10/2009 | Kikuchi et al. | | |
| 2013/0208912 A1 | 8/2013 | Wiederwohl | | |
| 2014/0236405 A1 | 8/2014 | Wakashiro | | |
| 2015/0291175 A1 | 10/2015 | Harada et al. | | |
| 2015/0367719 A1 | 12/2015 | Blasinski et al. | | |
| 2017/0334380 A1 | 11/2017 | Bonnet et al. | | |
| 2018/0162347 A1* | 6/2018 | Meyer | ................... | B60W 20/50 |
| 2018/0257633 A1* | 9/2018 | Meyer | ................... | B60W 10/02 |
| 2019/0061736 A1 | 2/2019 | Wiesbeck et al. | | |

FOREIGN PATENT DOCUMENTS

| | | |
|---|---|---|
| DE | 199 35 375 C1 | 7/2001 |
| DE | 11 2007 001 440 T5 | 4/2009 |
| DE | 10 2010 030 800 A1 | 1/2012 |
| DE | 10 2012 109 731 A1 | 4/2013 |
| DE | 10 2013 001 095 A1 | 7/2014 |
| DE | 11 2013 004 096 T5 | 5/2015 |
| DE | 10 2014 018 189 A1 | 6/2016 |
| EP | 2 757 012 A1 | 7/2014 |
| EP | 3 028 912 A1 | 6/2016 |
| WO | WO 2007/010953 A1 | 1/2007 |
| WO | WO 2014/102576 A2 | 7/2014 |
| WO | WO 2015/029507 A1 | 3/2015 |
| WO | WO 2016/024059 A1 | 2/2016 |

OTHER PUBLICATIONS

German-language Written Opinion (PCT/ISA/237) issued in PCT Application No. PCT/EP2017/058934 dated Nov. 2, 2017 (six (6) pages).
German-language Office Action issued in counterpart German Application No. 10 2016 207 039.8 dated Jan. 17, 2017 with partial English translation (12 pages).
German-language Office Action issued in counterpart German Application No. 10 2016 207 040.1 dated Jan. 17, 2017 with partial English translation (12 pages).
German-language Office Action issued in counterpart German Application No. 10 2016 207 043.6 dated Jan. 17, 2017 with partial English translation (12 pages).
German-language Office Action issued in counterpart German Application No. 10 2016 207 044.4 dated Jan. 17, 2017 with partial English translation (12 pages).
International Search Report (PCT/ISA/210) issued in PCT Application No. PCT/EP2017/058930 dated Jul. 27, 2017 with English translation (four (4) pages).
German-language Written Opinion (PCT/ISA/237) issued in PCT Application No. PCT/EP2017/058930 dated Nov. 2, 2017 (seven (7) pages).
German-language Office Action issued in counterpart German Application No. 10 2016 207 037.1 dated Dec. 23, 2016 with partial English translation (11 pages).
Chinese Office Action issued in Chinese application No. 201780025365.1 dated Nov. 23, 2020, with English translation (Fourteen (14) pages).

* cited by examiner

METHOD AND DEVICE FOR OPERATING A HYBRID VEHICLE COMPRISING AN ELECTRIC ENERGY STORE, AN ELECTRIC MOTOR AND AN INTERNAL COMBUSTION ENGINE

CROSS REFERENCE TO RELATED APPLICATIONS

This application is a continuation of PCT International Application No. PCT/EP2017/058934, filed Apr. 13, 2017, which claims priority under 35 U.S.C. § 119 from German Patent Application No. 10 2016 207 039.8, filed Apr. 26, 2016, the entire disclosures of which are herein expressly incorporated by reference.

This application contains subject matter related to U.S. application Ser. No. 16/170,591, entitled "Method and Device for Operating a Hybrid Vehicle Comprising an Electric Energy Store, an Electric Motor and an Internal Combustion Engine" filed on even date herewith.

BACKGROUND AND SUMMARY OF THE INVENTION

The invention relates to a method and an apparatus for operating a hybrid vehicle having an electric energy store, an electric motor as a first drive motor, and an internal combustion engine as a second drive motor.

A multiplicity of operating strategies of hybrid vehicles are already known that place their focus in particular on efficient driving.

The invention is based on the object of achieving a best possible state of charge for the electric energy store given the best possible comfort even while traveling.

The invention fundamentally relates to a method and an apparatus for operating a hybrid vehicle having an electric energy store (e.g. high-voltage battery), an electric drive and an internal combustion engine, wherein a special operating strategy for the internal combustion engine can be triggered that can achieve an increase in the state of charge of the energy store if prescribed acoustic conditions are met. The special operating strategy has a power-increasing effect by virtue of a raising of the load point to the point at which respective currently ascertained, preferably variably prescribable, acoustic limits are reached that are defined on the basis of ascertained masking potentials of particular acoustic events. In other words, a method and an apparatus for performing the method are proposed, which method raises the acoustic limits for controlling the load point of the internal combustion engine at least to the level that is currently admissible in each case on account of the masking of at least one acoustically relevant event, wherein possible acoustically relevant events are defined by vehicle-internal sources of influence whose characteristic spectra are known by virtue of empirical ascertainment and whose occurrences are controlled by vehicle-internal systems.

To this end, the masking potentials of particular acoustically relevant events are ascertained and, on the occurrence of multiple events having different masking potentials, are preferably used in coordinated fashion to define the respective acoustic limit currently needing to be prescribed.

The method according to the invention is performed by virtue of applicable programming of at least one electronic control unit intended for that purpose.

By way of example, in an implementation phase of the apparatus according to the invention for performing the method according to the invention, the individual masking potential is ascertained empirically, preferably as an (individual) sound pressure spectrum, for each defined acoustically relevant event and is stored in the control unit. After a hybrid vehicle equipped with the invention is started up, a check is performed to determine what acoustically relevant events are currently occurring in each case. To coordinate the respective masking potentials currently available at the same time, the maximum of all masking potentials is preferably ascertained, in particular in the form of a maximum sound pressure spectrum. By way of example, the overall sound pressure spectrum thus formed by way of example is compared with a load-dependent sound pressure spectrum of the internal combustion engine, which is considered as a sound source in this case, that is likewise kept in the control unit. That load point whose sound pressure spectrum is beneath the coordinated overall sound pressure spectrum in each case, or is sufficiently masked thereby, is then chosen for the internal combustion engine. The overall sound pressure spectrum is a particularly advantageous exemplary embodiment of an acoustic limit variably prescribable according to the invention. An acoustic limit could also be directly prescribed as a motor torque. This variable is less suitable than the consideration of sound pressure spectra, however, on the basis of the frequency dependency of the motor acoustics and the masking.

A raising of the load point can be prescribed by an absolute load value as a function of the respective occurring acoustically relevant masking events or else as the difference from a basic load value, which may likewise be prescribed by a basic sound spectrum. A basic sound spectrum of this kind may also be ascertained empirically and stored in the control unit, for example. By way of example, the basic sound spectrum may be an audible motor sound usually accepted as a maximum if no additional masking events compared with a basic state (e.g.: on the basis of speed-dependent wind noise or road noise, which is always at least present, on a flat or smooth road) are occurring. The basic sound spectrum is subsequently also referred to as the basic state or basic acoustic threshold. The basic acoustic threshold is normally dependent on the running state, such as e.g. on the driver's desired drive torque and on the speed.

Preferably, the following possible acoustically relevant events with their characteristic masking potentials are taken into consideration on their own or in any desired combination with one another:

1) Events as a result of vehicle-internal sources of influence, in particular whose characteristic spectra are known and/or whose occurrences are controlled by vehicle-internal systems, such as fans of the air conditioning system, open windows or an open sliding roof, preferably also on the basis of seat occupancy and/or vehicle speed. In this case, wideband masking potentials, in particular, are taken into consideration. By way of example, a distinction can also be made between a standstill and a journey in this case.
2) Events as a result of vehicle-external sources of influence, in particular whose characteristic spectra are known and/or whose occurrences are capturable by sensors, such as rain, road surface or travel through a tunnel. In this case too, preferably wideband masking effects are preferred.
3) Events as a result of sources of influence caused by the user, in particular as a result of the operation of audio installations, in particular whose spectra are evaluable before or during reproduction, such as audio installations whose data are stored on hard disk, or digital radios with delayed computation or signal propagation times.
4) Events as a result of unknown sources of influence, in particular whose spectra are unknown beforehand or that need to be captured via at least one microphone, wherein in this case only a reduced masking potential can be assumed on the basis of the expected high signal dynamics, which may be higher than the adjustable dynamics of the sound source (motor).

Still further events may be defined. Acoustically relevant events can be understood to mean both airborne sound emissions and vibrations.

Further details re 1):

A first preferred exemplary embodiment assumes a comparatively high masking potential with the fan of the heating and air conditioning system as control system switched on. Preferably, an increasing raising of the load point in the sense of an increasing motor torque of the internal combustion engine is therefore fundamentally performed for charging as the fan level increases (at at least one level through to continuous adjustment). In this case, the raising of the load point can be performed when the vehicle is at a standstill by virtue of an absolute value, independently of the basic state or of a basic acoustic threshold. While traveling, the raising of the load point can be performed on the basis of the fan level as an offset relative to the basic state or to a basic acoustic threshold.

A second preferred exemplary embodiment assumes a comparatively high masking potential with a window and/or sliding roof open, wherein in this case the control systems for opening and closing the windows and the sliding roof know the current aperture width thereof. These can then likewise have empirically ascertained applicable masking potentials assigned to them. In this case, the masking potential can also be determined on the basis of the position of an open window in relation to the position of an occupied seat. With regard to the sliding roof, it is possible, by way of example, for two or more aperture dimensions to be assigned to two or more different masking potentials.

The masking potentials and the number of levels of the masking potentials, in this case depending on the fan level or on the degrees of opening, for example, can be ascertained empirically and stored in the form of torque or spectra characteristic curve families.

Further details re 2):

A first preferred exemplary embodiment assumes a comparatively high masking potential in the event of rain. Detection of this event is possible e.g. by means of a rain sensor, use of the windshield wiper and/or by means of radar sensors for distance measurement. Preferably, to distinguish between rain and snow, the outside temperature is also evaluated, for example.

A second preferred exemplary embodiment assumes a comparatively high masking potential in the case of a rough and/or uneven road surface. Detection of this event is possible e.g. on the basis of signals from the chassis control systems.

A third preferred exemplary embodiment assumes a comparatively high masking potential in the event of travel through a tunnel. Detection of this event is possible e.g. by means of cameras for distance control or for lane change assistance and/or by means of road data from a navigation system and/or brightness sensors for low beam control.

Fundamentally, it is assumed that influences from outside also fundamentally result in particular masking effects that can be used for increasing (for a limited time) the raising of the load point. The occurrence and level of the masking potential are captured for different aspects by means of respective suitable vehicle sensors, where possible. Subsequently, as with any defined detected masking potential, it is assigned to maximum admissible acoustic thresholds for possible load point raises.

Further details re 3):

Masking is provided on the basis of the output spectrum and the volume of the audio installation, for example. To determine the masking potential of the audio installation, analysis or matching of this output spectrum with the drive acoustics on which the basic acoustic limits are fundamentally based is required. In this case, the drive acoustics can be introduced e.g. by spectra ascertained and stored in advance. These spectra are dependent in particular on motor speed, load, speed and/or gear.

On the basis of computation complexity and signal propagation times, there is provision for a short delay in the audio reproduction. For audio data (such as e.g. data stored on the hard disk) or audio sources with an inherent computation and signal propagation time (such as e.g. digital sources such as DAB, DVB-T, satellite radio or the like) that are already present in the vehicle, the masking potential can also already be ascertained offline or appropriately in advance. In this case, the source can be evaluated before the output, but also in parallel with the output in advance. The necessary degree of advance for the computation of the masking potential can also be provided more quickly than in real time by virtue of the design of a buffer for output by means of computation of the audio output. Provision can be made for all or some of the computations needed for output during the D/A conversion of the digital sources to be used for the spectral analysis needed for ascertaining the masking potential, in order to use synergies.

In the event of the masking potential abruptly becoming much lower based on the output spectrum of the audio installation, the proportion of load point raising also first needs to be reduced abruptly on the basis of this masking potential. Additionally, it may also be desirable to lower the raising of the load point even below the static supply of data (that is to say beneath the basic acoustic limit) so that the quiet audio experience is tarnished all the less by the acoustics of the internal combustion engine.

This process involves multiple controllers in the vehicle:

a) controller(s) for the audio installation, b) controller(s) for the drive.

To ascertain the masking potential, the following steps are necessary:

1. ascertaining the spectrum of the output for the audio installation.

2. establishing the operating point or the motor speed 3. ascertaining the maskable motor load on the basis of the spectrum from step 1 and from stored spectra of the motor acoustics.

4. implementing the ascertained masking potential by possibly increasing the raising of the load point.

By way of example, step 1 can be performed on controller a) and steps 2 and 4 can be performed on controller b).

For step 3, there are the following options requiring different communication processes between controllers a) and b). The controller b) for the stored spectra of the motor acoustics can also vary:

i. step 3 takes place on controller b).

In this case, the spectra ascertained in step 1 in controller a) need to be routed to controller b).

The spectra of the motor acoustics are on controller b).

ii. step 3 takes place on controller a).

The operating point needs to be sent from controller a) to controller b), and the ascertained masking potential in turn from a) to b).

The spectra of the motor acoustics are on controller a).

iii. As ii., but not only a masking potential is sent from a) to b), but rather a family of characteristic curves for the potential. The aforementioned degree of advance means that the future operating point is known only approximately. The potential is therefore ascertained not only for a particular operating point, but rather for the current operating point and its direct "surroundings" or else for further operating points having a high probability of occurrence. As such, a family of characteristic curves for potential is obtained for multiple operating points, instead of a "potential value" for one operating point.

Further details re 4):

Acoustic masking with a dynamic spectrum can also be factored into the formation of the acoustic limits in a manner according to the invention. This requires the significant effects to be identified and communicated to the motor control/operating strategy in this case too. On the basis of the masking, acoustic limits can be raised again.

Masking can have every possible cause in this case, which does not have to be known more specifically, however. In the interior, the airborne sound spectrum can thus be measured by one or more microphones. To determine the masking potential, analysis or matching of this measured spectrum with the drive acoustics (basic acoustic limits) is necessary in this case too.

As the dynamics of the microphone signal may be very high, it is necessary to be able to react with the raising of the load point accordingly quickly. This reaction speed is related inter alia to the dynamics of the internal combustion engine, which are determined inter alia by the dynamics of the filling and the dynamics of the ignition angle. In this case, the dynamics of the ignition angle are much higher than those of the filling. In the event of an increase in torque, adequate filling is a prerequisite for high dynamics as a result of a change in the ignition angle, however. Controlling the motor torque by means of the filling is better for consumption, but if the dynamics thereof are not sufficient for the required reaction time, it is necessary to react by means of the ignition angle.

It is possibly necessary, owing to the high dynamics of the microphone signal and the shortest possible interval of time between microphone signal and enabling of the raising of the load point, to keep the additional raising of the load point that is enabled from this functionality rather small so that it can also quickly be reduced again. If the interval of time between microphone signal and enabling of the raising of the load point becomes too long, it may be that the raising of the load point is still increased even though there are already no further masking sounds in the interior of the vehicle. The consideration of the events according to item 4) is thus probably possible only to a limited extent and very briefly.

Preferably, it is possible to check whether a raising of the load point on the basis of an identified masking potential is intended to be prevented or reduced by an acoustically opposite event.

As a development of the invention or as an independent concept, the occurrence of an acoustically opposite event can result in a lowering of the load point, even to the point of the internal combustion engine being switched off, either on the basis of or independently of an available masking potential. An acoustically opposite event may be a situation in which, by way of example, there is no or only little masking and/or in which there is an acoustic exceptional situation with comparatively low probability of occurrence in which particularly few interference signals are desirable, e.g. in the case of an incoming telephone call. An acoustically opposite event could also be an open window at a standstill as a result of which the sounds and/or vibrations of the internal combustion engine are perceived to a greater extent than usual.

As a result of the invention, the defined events having the applicable masking potentials are preferably used in coordinated fashion for the raising of the acoustic limits for raising the load point or varying the load point.

The invention is based on the following considerations:

In hybrid vehicles, variation of the load point of the internal combustion engine, in particular raising of the load point, is limited by acoustic limits in order to avoid acoustic anomalies. According to the prior art, these acoustic limits, subsequently also called basic acoustic limits, are empirically regulated in particular on the basis of static vehicle properties and operating points of the drive (e.g. on the basis of vehicle speed, driver's desired torque, motor torque, motor speed and gear).

Fundamentally, the acoustic limits can be raised for a particularly high power requirement that exists, for example, in the event of increased vehicle electric system load and/or low state of charge. However, this possibly results in undesirable sensitivity to noise for the driver.

As a result of a wide variety of sources and changes to the transmission paths (e.g. as a result of vehicle-external influences such as rain, road surface and travel through a tunnel or as a result of vehicle-internal influences such as fans of the air conditioning system, open windows, open sliding roof, folded rear seat and seat occupancy or as a result of influences caused by the user such as telephone calls, conversations and music sources via vehicle-internal or independent audio installations), there are airborne sound emissions in the vehicle interior whose masking potential can be ascertained in each case using different methods (such as, for example, by using at least one interior microphone, by analyzing a played-back audio source in the vehicle or indirectly by virtue of derivation from signals from the vehicle sensors, such as the rain sensor, the height sensors or the navigation data, for example).

The masking allows the acoustic limits to be raised without losses of comfort.

Simultaneous use of multiple possible masking potentials (individual or overlaid masking potentials) involves a coordination method for ascertaining resultant acoustic limits being provided according to the invention. This allows an improvement in the overall acoustic behavior to be achieved.

This first of all involves the individual masking potentials for different sources (or acoustic events) having particular properties (subsequently also called aspects, with in particular characteristic acoustic spectra being included) being ascertained (see also the aforementioned examples 1) to 4) for possible acoustically relevant events or sources).

Subsequently, the ascertained individual masking potentials are coordinated as follows, for example:

1. First, the masking potential is ascertained per aspect or per event having an applicable acoustic spectrum.
2. Subsequently, the maximum is ascertained from all (possibly simultaneously available) masking potentials, the acoustic limits dependent on the static vehicle properties and operating points of vehicle and drive preferably also being able to be taken into consideration in the form of the aforementioned basic acoustic limits (basic state).
3. Lastly, the check can preferably also be performed to determine whether a raising of the load point on the basis of an identified masking potential is prevented or reduced by an acoustically opposite event. By way of example, a possible raising of the load point on the basis of an open window could be ascertained that could be perceived as acoustically more disruptive again at a standstill or during a telephone call than while traveling, however.

4. The "new" acoustic limit respectively ascertained in this manner for a current operating state is then enabled and forms the upper limit for the raising of the load point if, should the situation arise, there is no other check result available in item 3. that leads to a lowering of the upper limit (even below the basic acoustic limits).

For steps 1. and 2., there are the following options, for example, which are applicable alternatively or together:

I. The potentials are each ascertained for the current operating point as a torque (in newton meters [Nm]) and subsequently combined.

II. The potentials are ascertained and combined as an (airborne) sound spectrum (in decibels [dB]) for the present. This preferred alternative is explained in even more detail later on in an exemplary embodiment (with reference to the drawing).

In detail, option I. may be configured as follows:

First, the respective acoustic limits in newton meters [Nm] are ascertained for the respective aspects, either directly as absolute values or first relative to the currently applicable basic acoustic limit. One example for the case as a relative value: on the basis of the running highest fan level of the air conditioning system, the internal combustion engine can provide 5 [Nm] more torque for charging the energy store (e.g. high-voltage battery). Subsequently, the relative values are converted into absolute values by adding them to the current basic acoustic limit. The maximum value is then computed from the various acoustic limits and is then the "new" acoustic limit.

In detail, option II. may be configured as follows:

First, (airborne) sound spectra are ascertained for respective aspects. These are measured directly (e.g. in the case of masking ascertainment by means of interior microphones), ascertained directly (e.g. in the case of masking ascertainment by means of the output signal from the audio installation) or ascertained indirectly (using state detection by means of sensors or control systems and stored spectra, e.g. in the case of travel through a tunnel, an open window at significant speeds or high interior fan levels). Subsequently, the maximum is computed from these various sound spectra, for example per one-third octave band, as the overall sound spectrum.

On the basis of this one-third octave spectrum, the maximum order level for the relevant internal combustion engine orders for the current motor speed or corresponding frequencies is then determined. This can be effected, for example, on the basis of an interval, possibly dependent on frequency, between the cumulative level of the spectrum and the order level or else using tonality methods that can compute the level at which tonal components can be masked by wideband spectra.

From this/these maximum order level(s), a maximum internal combustion engine load in newton meters [Nm] is subsequently derived on the basis of stored data from airborne sound order levels in the interior for different internal combustion engine loads.

The "new upper limit" (new acoustic limit) according to option II. is then determined as the maximum of this ascertained internal combustion engine load and possibly of the "static" basic acoustic limit valid at the respective operating point.

If a mixture of options I. and II. is used, the acoustic limits in newton meters that are ascertained according to option I. can be used in the method according to option II. at this juncture.

Regardless of whether the upper limits or the "new" acoustic limits are ascertained according to option I. or option II., it is preferably also ascertained, in parallel with the ascertainment of the "new upper limits", whether the raising of the load point in the current operating state of the vehicle is intended to be limited for a specific reason (e.g. acoustically opposite event):

The reasons for limiting the raising of the load point despite the occurrence of masking events or even for a reduction in the acoustic limit are normally states that strongly influence the transmission path, but have a low probability of occurrence and accordingly are also not taken into consideration in the "static" supply of data for the basic acoustic limit, because this would lead to heavy permanent limitations for the raising of the load point. Examples that may be cited here are open windows at a standstill on account of a direct repercussion of the exhaust system mouth sound.

In addition, there is provision for the raising of the load point to be limited despite the occurrence of masking events or even for the acoustic limits to be reduced on the basis of temporary, quasi-static and/or dynamically increased acoustic demands. An example of a quasi-static state is an incoming/ongoing telephone call. A corresponding dynamic event may be e.g. a passage with a greatly reduced volume in the music played back by the audio installation.

In this regard, enable requests and applicable reduced upper limits can be ascertained in separate software functions. Furthermore, in this case too, the overall energy state of the vehicle can be taken into consideration and, for example, a reduction in the raising of the load point can be prevented in the event of a very low state of charge in the high voltage store.

To conclude the coordination, the final acoustic limit as the minimum of the "new upper limit" and the lowest enabled reduced upper limit is established and enabled.

In parallel with the masking of the airborne sound in the interior, it is also possible to use masking potentials for vibrations. For example, vibrations at the seat, caused by stimulation from the internal combustion engine, can impair comfort and can be masked by vibrations caused by a poor road surface. These masking potentials can then also preferably be coordinated as acceleration spectra. The sequence for ascertaining the upper limits on the basis of vibrations takes place in an analogous manner to the airborne sound. The contributions are likewise combined either "in newton meters" (according to option I.) or "by means of acceleration spectra" (option II.). The upper limits on the basis of the airborne sound with the upper limits on the basis of vibrations are preferably combined "in newton meters".

When the various masking potentials are used, the occurrence thereof can be taken as a basis for improving the hybrid properties (e.g.: electric driving components, air conditioning performance) without limiting comfort. An acoustically rather uncomfortable raising of the acoustic limits only in the event of significantly increased need and/or only in the event of a very low state of charge in the high-voltage store will occur less frequently. The invention affords the advantage of optimum coordination of the individual presets from the static vehicle properties and operating points (basis) and from the individual functions for ascertaining the respective current individual or overall masking potential. The coordination contributes to further diffusing the conflict of aims between hybrid properties and comfort.

Until a target state of charge is reached, it is therefore possible for more intense charging to be performed, even without more highly perceptible noise, than during regular operation and/or (alternatively or additionally in a second step for an even greater power increase) for efficient operating points of the internal combustion engine to be used that could not be used otherwise on the basis of acoustic limits. The emission increase briefly caused as a result is compensated for again by the stored electric power for driving the emission-free electric motor.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
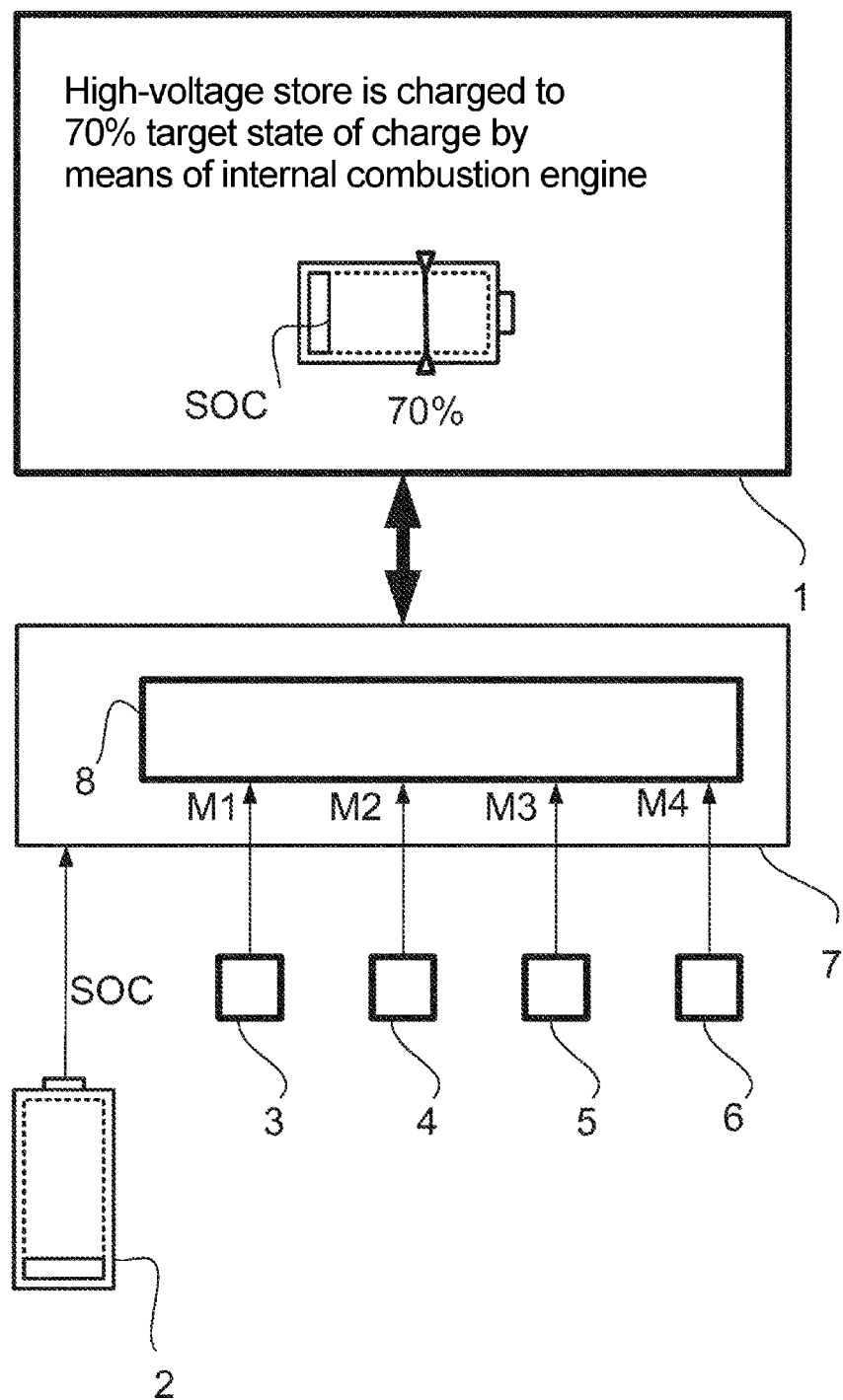
FIG. 1 is a schematic depiction of an overview of the essential components of the invention.

FIG. 1 depicts an input/output display 1 at least for the output of information pertaining to the specific method of operation according to the invention. The display 1 is actuated via an electronic control unit 7. The current state of charge SOC of an electric energy store 2, in this case a high-voltage battery, is captured and forwarded to the display 1.

A further input signal for the control unit 7 will be the status of an air conditioning fan 3, for example, in this case as an example of a possible acoustically relevant event by a vehicle-internal source of influence whose characteristic spectrum is known and whose occurrence is controlled by a vehicle-internal system, in this case the air conditioning system. The masking potential of the air conditioning fan 3 is indicated by M1.

A further input signal for the control unit 7 will be the status of a sensor arrangement 4 for detecting travel through a tunnel, for example, in this case as an example of a possible acoustically relevant event by a vehicle-external source of influence whose characteristic spectrum is known and whose occurrence is capturable by sensors, in this case by a camera in conjunction with a navigation system, for example. The masking potential of detected travel through a tunnel is indicated by M2.

A further input signal for the control unit 7 will be the signal from an audio installation 5, for example, in this case as an example of a possible acoustically relevant event by a user-caused source of influence whose characteristic spectrum is evaluable before or during reproduction. The masking potential of the current output from an audio installation 5 is indicated by M3.

A further input signal for the control unit 7 will be the input signal from a microphone 6, for example, in this case as an example of a possible acoustically relevant event by an unknown source of influence whose characteristic spectrum is unknown beforehand and is ascertainable only highly dynamically. The masking potential of the airborne sound spectrum currently captured by means of the microphone 6 (for example a conversation by vehicle occupants) is indicated by M4.

The masking potentials M1 to M4 are ascertained in a functional module 8 of the controller 7 and if need be coordinated.

Figure 2:
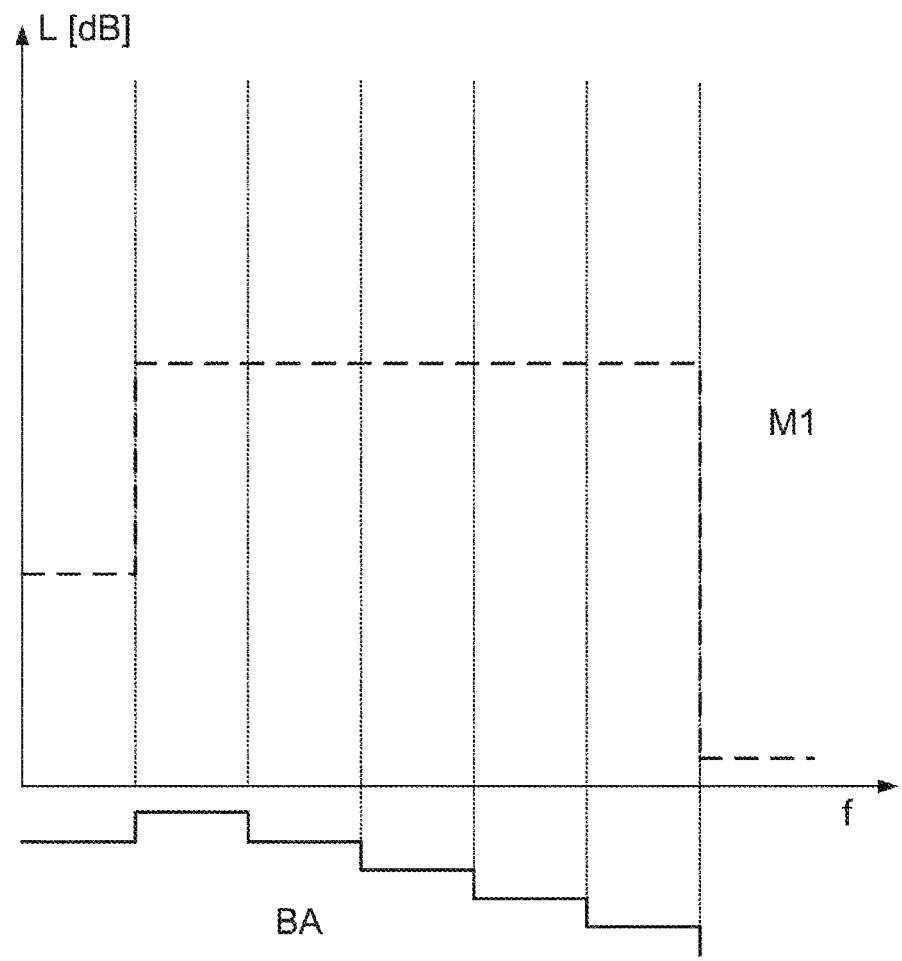
FIG. 2 is an example of a first individual masking potential.

The individual masking potential M1 of the air conditioning fan 3 is depicted by way of example in FIG. 2.

Figure 3:
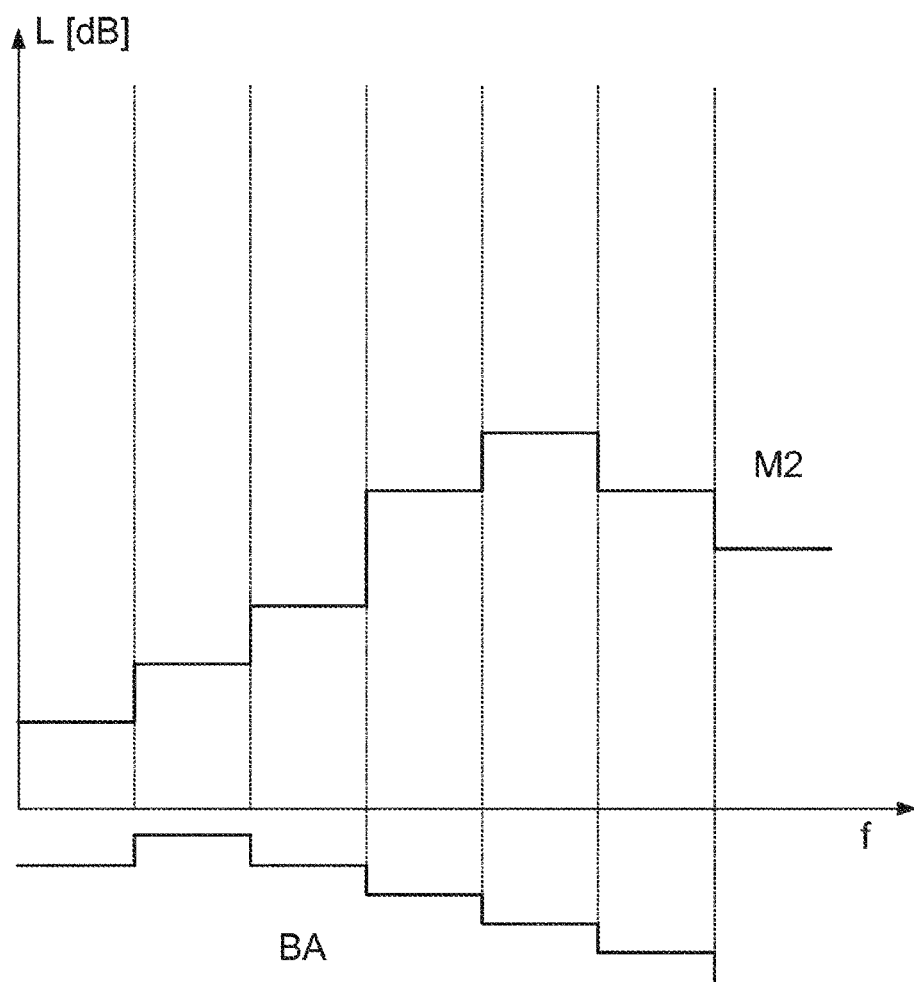
FIG. 3 is an example of a second individual masking potential.

The individual masking potential M2 of detected travel through a tunnel is depicted by way of example in FIG. 3.

Figure 4:
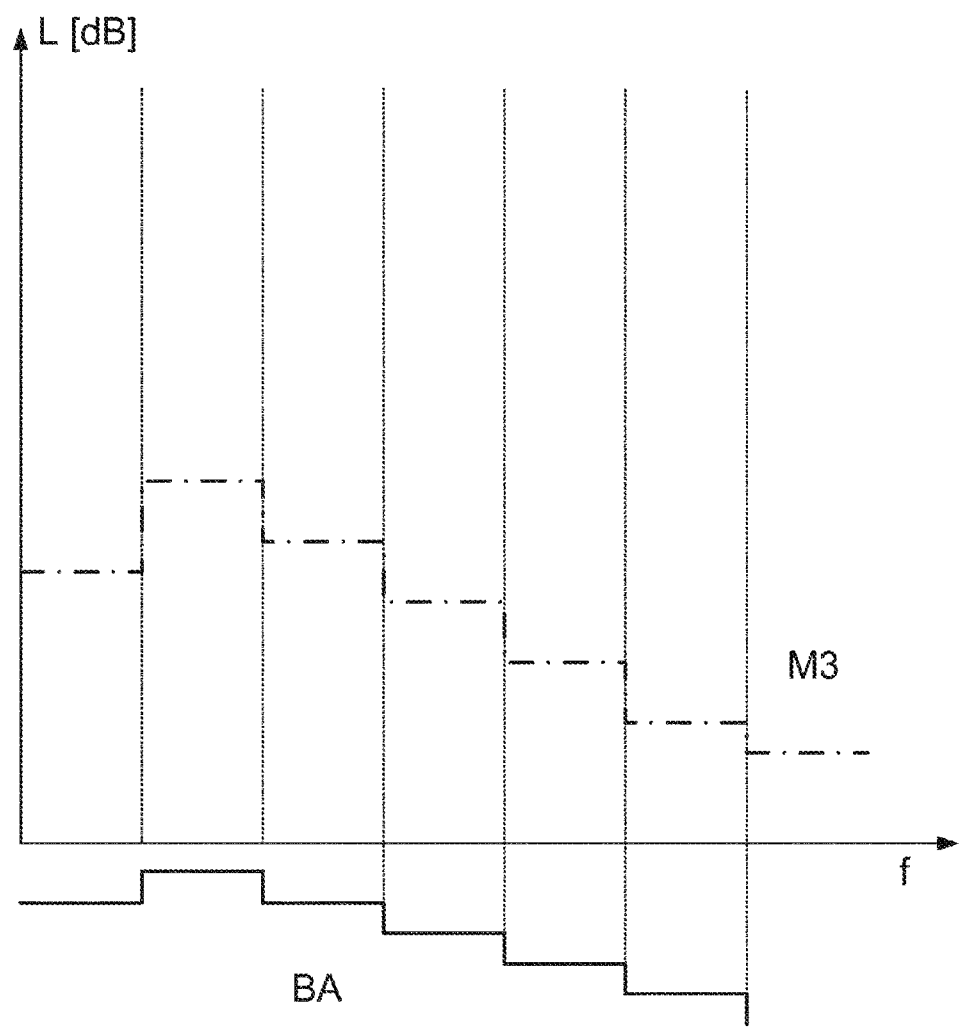
FIG. 4 is an example of a third individual masking potential.

The individual masking potential M3 of the current output for an audio installation 5 is depicted by way of example in FIG. 4.

Figure 5:
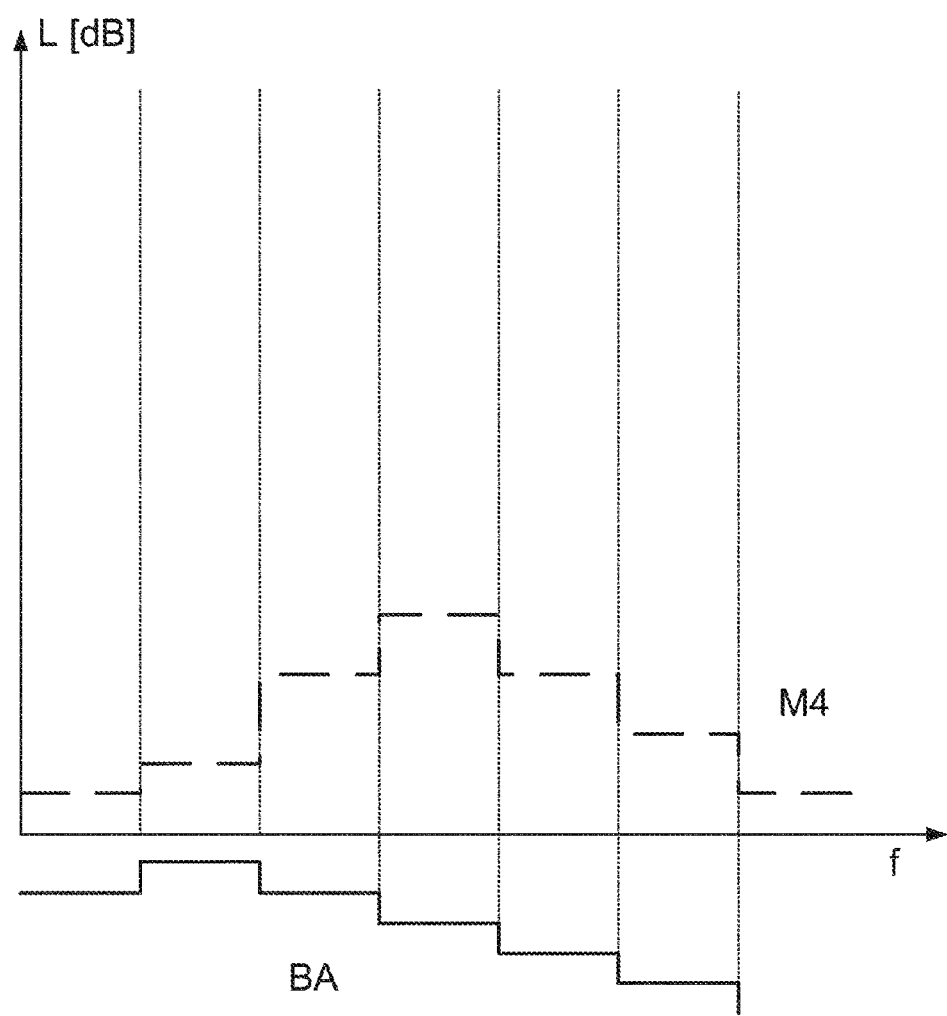
FIG. 5 is an example of a fourth individual masking potential.

The individual masking potential M4 of the airborne sound spectrum currently captured by means of the microphone 6 is depicted by way of example in FIG. 5.

The masking potentials are depicted in decibels [dB] in this case and relative to a basic acoustic threshold BA in this case.

Figure 6:
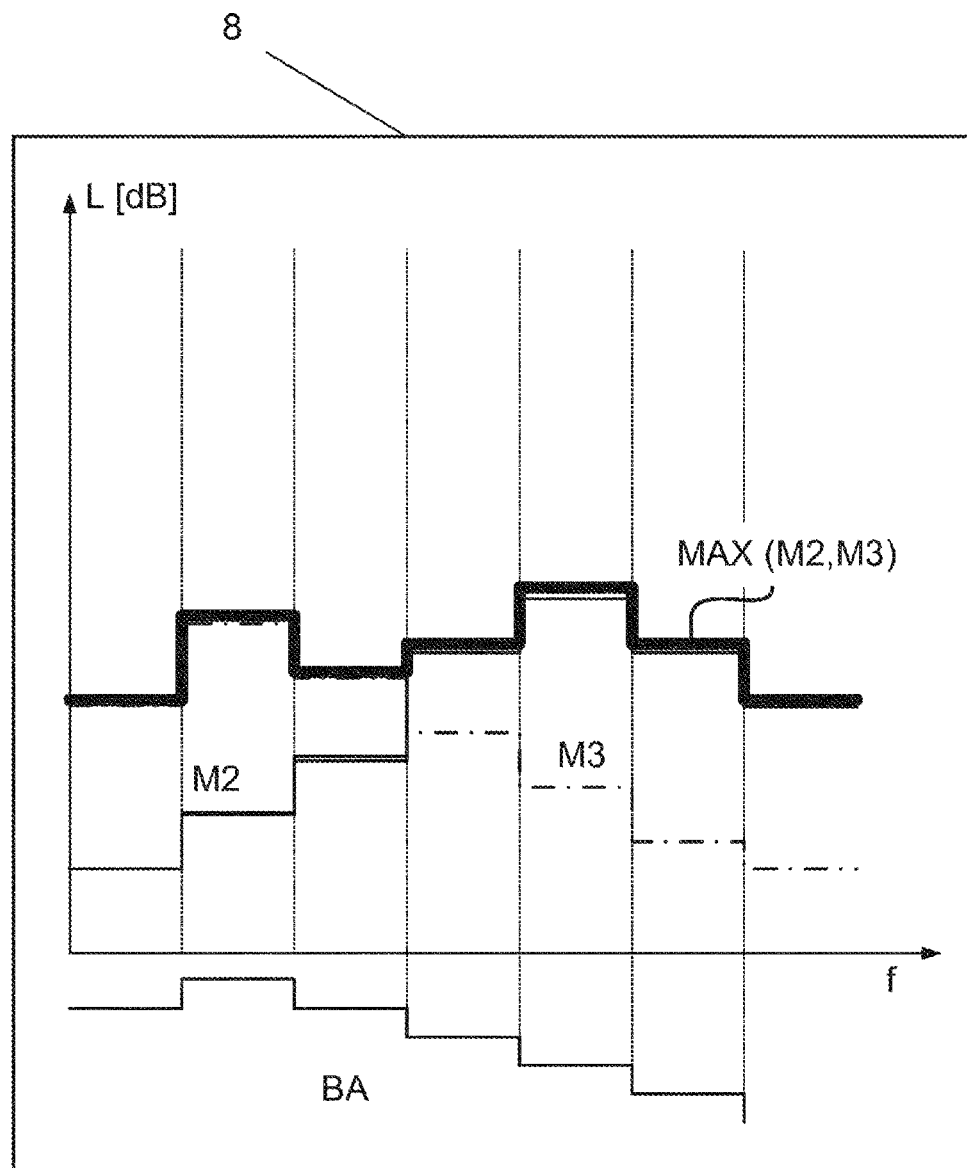
FIG. 6 is a graph for the inventive ascertainment of a "new" overall-masking-dependent acoustic limit in the case of overlaid masking potentials according to the aforementioned option II.

FIG. 6 uses an example graph to show the mode of action of the coordination method according to the invention performable by virtue of appropriate programming of the functional module 8. In this case, a (one-third octave) sound pressure spectrum of the audio installation 5, or the masking potential M3, and a (one-third octave) sound pressure spectrum as a result of traveling through a tunnel, or the masking potential M2, are depicted, which together form a new (one-third octave) spectrum or a cumulative masking potential MAX (M2, M3) or an overall sound pressure spectrum (denoted by the bold line).

Subsequently, it is ascertained how high the order level of the internal combustion orders is that can be masked by this overall sound spectrum. Stored data are then used to convert this order level into a motor torque in newton meters [Nm]. At the end of this partial process, the matching with the basic acoustic limit BA then takes place, in [Nm], if need be, said basic acoustic limit being dependent on the static vehicle properties and operating points of vehicle and drive.

The basic acoustic limit BA can be prescribed preferably when none of the other masking potentials M1 to M4 are available.

In a particular configuration of the invention, when there is a specific reason, it is also possible for a "lower acoustic limit", which may even be beneath the basic acoustic limit, to be prescribed on the basis of or independently of the occurrence of a masking acoustically relevant event. This prevention or reduction of the raising of the load point or this lowering of the load point—even below the basic acoustic limit or independently of a basic acoustic limit—can be regarded not only as a development of the invention but also as an independent concept. By way of example, a lowering of the load point can be used as an extended "mute" function for a telephone call. In this case, depending on the state of charge, it would also be possible to change over to full electric driving.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a hybrid vehicle having an electric energy store, an electric drive and an internal combustion engine, the method comprising the acts of:
   determining an acoustic masking potential of at least one acoustic event, wherein the at least one acoustic event includes a first acoustic event defined by vehicle-internal sources controlled by vehicle-internal systems;
   determining an acoustic limit for the internal combustion engine, wherein the acoustic limit is below the acoustic masking potential;
   determining a load point for the internal combustion engine such that a load-dependent sound spectrum of the internal combustion engine matches the acoustic limit, and such that operating the internal combustion engine at the load point generates excess torque;
   operating the internal combustion engine at the load point so as to generate the excess torque; and
   charging the electric energy store using the excess torque generated by operating the internal combustion at the load point.

2. The method as claimed in claim 1, wherein the masking potential is an overall masking potential of a plurality of current acoustic events, each having different individual masking potentials.

3. The method as claimed in claim 2, wherein determining the overall masking potential involves the maximum of all simultaneously available masking potentials.

4. The method as claimed in claim 2, wherein the individual masking potentials and/or the overall masking potential are prescribed in the form of sound pressure spectra.

5. The method as claimed in claim 1, wherein the acoustic limit is below a basic acoustic limit of the internal combustion engine.

6. The method as claimed in claim 1, wherein the at least one acoustic event includes a second acoustic event defined by vehicle-external sources whose occurrences are capturable by sensors.

7. The method as claimed in claim 6, wherein the second acoustic event includes output signals from audio installations.

8. The method as claimed in claim 7,
   wherein the second acoustic event is defined by an unknown source and is captured via at least one microphone, and
   wherein the masking potential is determined to be brief and in accordance with basis of the expected high signal dynamics.

9. A computer product comprising a non-transitory computer readable medium having stored thereon program code segments that, when executed by a processor of an electronic control unit, carry out the acts of:
   determining an acoustic masking potential of at least one acoustic event, wherein the at least one acoustic event includes a first acoustic event defined by vehicle-internal sources controlled by vehicle-internal systems;
   determining an acoustic limit for the internal combustion engine, wherein the acoustic limit is below the acoustic masking potential;
   determining a load point for the internal combustion engine such that a load-dependent sound spectrum of the internal combustion engine matches the acoustic limit, and such that operating the internal combustion engine at the load point generates excess torque;
   operating the internal combustion engine at the load point so as to generate the excess torque; and
   charging the electric energy store using the excess torque generated by operating the internal combustion at the load point.

10. A hybrid vehicle, having:
    an electronic control unit; and
    a non-transitory computer readable medium having stored thereon program code segments that, when executed by a processor of the electronic control unit, carry out the acts of:
      determining an acoustic masking potential of at least one acoustic event, wherein the at least one acoustic event includes a first acoustic event defined by vehicle-internal sources controlled by vehicle-internal systems;
      determining an acoustic limit for the internal combustion engine, wherein the acoustic limit is below the acoustic masking potential;
      determining a load point for the internal combustion engine such that a load-dependent sound spectrum of the internal combustion engine matches the acoustic limit, and such that operating the internal combustion engine at the load point generates excess torque;
      operating the internal combustion engine at the load point so as to generate the excess torque; and
      charging the electric energy store using the excess torque generated by operating the internal combustion at the load point.

* * * * *